United States Patent
Nguyen et al.

(10) Patent No.: US 8,095,749 B1
(45) Date of Patent: Jan. 10, 2012

(54) APPLICATION PRE-LAUNCH TO REDUCE USER INTERFACE LATENCY

(75) Inventors: Phuong Viet Nguyen, San Jose, CA (US); Ashish Garg, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/227,343

(22) Filed: Sep. 7, 2011

Related U.S. Application Data

(63) Continuation of application No. 11/454,092, filed on Jun. 14, 2006, now Pat. No. 8,060,704, which is a continuation of application No. 10/396,771, filed on Mar. 24, 2003, now Pat. No. 7,076,616.

(51) Int. Cl.
*G06F 12/00* (2006.01)
*G06F 9/48* (2006.01)

(52) U.S. Cl. . 711/154; 711/100; 711/167; 711/E12.001; 718/107; 718/108; 725/151

(58) Field of Classification Search .................. None
See application file for complete search history.

(56) References Cited

U.S. PATENT DOCUMENTS

| | | |
|---|---|---|
| 4,912,628 A | 3/1990 | Briggs |
| 5,189,733 A | 2/1993 | Bennett et al. |
| 5,226,149 A | 7/1993 | Yoshida et al. |
| 5,349,680 A | 9/1994 | Fukuoka |
| 5,539,920 A | 7/1996 | Menand et al. |
| 5,563,648 A * | 10/1996 | Menand et al. ............... 725/142 |
| 5,907,702 A * | 5/1999 | Flynn et al. .................... 718/108 |
| 6,016,520 A * | 1/2000 | Facq et al. ....................... 710/33 |
| 6,201,488 B1 | 3/2001 | Sato et al. |
| 6,675,192 B2 * | 1/2004 | Emer et al. .................... 711/156 |
| 6,792,616 B1 | 9/2004 | Jerding et al. |
| 2002/0059618 A1 | 5/2002 | Venter |
| 2002/0092021 A1 * | 7/2002 | Yap et al. ......................... 725/55 |

OTHER PUBLICATIONS

The American Heritage College Dictionary, 2002, Houghton Mifllin, 4th ed. pp. 388.
The American Heritage College Dictionary, 2002, Houghton Mifllin, 4th ed. pp. 1434-1435.
Computer Desktop Encyclopedia, 1981-2009, http://www.computerlanguage.comlwebexamples.htm.

* cited by examiner

*Primary Examiner* — Michael Krofcheck
(74) *Attorney, Agent, or Firm* — Haverstock & Owens LLP

(57) ABSTRACT

A device stores a plurality of applications and a list of associations for those applications. The applications are preferably stored within a secondary memory of the device, and once launched each application is loaded into RAM. Each application is preferably associated to one or more of the other applications. Preferably, no applications are launched when the device is powered on. A user selects an application, which is then launched by the device, thereby loading the application from the secondary memory to RAM. Whenever an application is determined to be associated with a currently active state application, and that associated application has yet to be loaded from secondary memory to RAM, the associated application is pre-launched such that the associated application is loaded into RAM, but is set to an inactive state.

17 Claims, 4 Drawing Sheets

APPLICATION PRE-LAUNCH TO REDUCE USER INTERFACE LATENCY

This Patent Application is a continuation of co-pending U.S. patent application Ser. No. 11/454,092, filed on Jun. 14, 2006, and entitled "Application Pre-Launch To Reduce User Interface Latency," which is a continuation of U.S. patent application Ser. No. 10/396,771, filed on Mar. 24, 2003, and entitled "Application Pre-Launch To Reduce User Interface Latency," now issued as U.S. Pat. No. 7,076,616, both of which are hereby incorporated by reference.

FIELD OF THE INVENTION

The present invention relates to the field of application resource management. More particularly, the present invention relates to the field of application resource management for set-top boxes.

BACKGROUND OF THE INVENTION

In many hardware devices, system resources such as memory and processing power are scaled to meet current device application requirements and/or to reduce costs. Such devices typically include a number of applications which are stored in a secondary storage device within the device. When an application is first used after the device is powered on, the application is loaded from the secondary storage device to random access memory (RAM). This process requires system resources and time to perform. System resource management is a primary concern in devices comprising limited system resources. In particular, television set-top boxes and related interactive televisions include limited system resources.

Set-top boxes are often used as intermediary devices between a content source, such as a personal computer or a remote cable television provider, and a display device, such as a television. Often, set-top boxes include multiple applications including content menus and display parameter settings. When initially loading these applications into RAM or when switching from one application to another, overtaxed system resources may lead to excessive delays and/or system failures. Further, if a device with limited system resources is capable of receiving new or upgraded applications, such enhancements may lead to further delays and system failures.

SUMMARY OF THE INVENTION

The present invention includes a device that stores a plurality of applications and a list of associations for those applications. The applications are preferably stored within a secondary memory of the device, and once launched each application is loaded into RAM. Preferably, the second memory is a non-volatile memory. Each application is preferably associated to one or more of the other applications. Preferably, no applications are launched when the device is powered on. A user selects an application, which is then launched by the device, thereby loading the application from the secondary memory to RAM. Whenever an application is determined to be associated with a currently active state application, and that associated application has yet to be loaded from secondary memory to RAM, the associated application is pre-launched such that the associated application is loaded into RAM, but is set to an inactive state.

In one aspect of the present invention, a method optimizes system resources within an application device. The method includes setting a first application in an active state, selecting a second application related to the first application, wherein selecting the second application is performed by the application device, launching the second application, thereby setting the second application in an inactive state while the first application remains in the active state; selecting the second application for use, de-activating the first application, thereby setting the first application in the inactive state while the second application remains in the inactive state, and activating the second application, thereby setting the second application in an active state. Setting the first application in the active state can comprise actively processing the first application with a central processing unit (CPU) of the application device. Setting the first application can further comprise loading the first application from a secondary memory to a random access memory (RAM) of the application device prior to actively processing the first application. Launching the second application can comprise loading the second application from a secondary memory to a random access memory (RAM), thereby setting the second application in an inactive state within the RAM. The CPU does not actively process the first application while the first application is in the inactive state. Activating the second application can comprise the CPU actively processing the second application, thereby setting the second application in an active state. The CPU does not actively process the second application while the second application is in the inactive state. The method can further comprise selecting a third application related to the second application, wherein selecting the third application is performed by the application device, and launching the third application, thereby setting the third application in an inactive state while the second application remains in the active state. The method can further comprise selecting the third application for use, de-activating the second application, thereby setting the second application in the inactive state while the third application remains in the inactive state, and activating the third application, thereby setting the third application in an active state. The second application can be related to the first application based on a list of associations stored in a system file. The list of associations can be determined by technical relativity, user history relativity or a combination thereof.

In another aspect of the present invention, a method optimizes system resources within an application device. The method includes powering on the application device, selecting a first application by a user launching the first application, thereby setting the first application in an inactive state, activating the first application, thereby setting the first application in an active state, selecting a second application related to the first application, wherein selecting the second application is performed by the application device, launching the second application, thereby setting the second application in an inactive state while the first application remains in the active state, selecting the second application by the user, de-activating the first application, thereby setting the first application in the inactive state while the second application remains in the inactive state, and activating the second application, thereby setting the second application in an active state. Launching the first application can comprise loading the first application from a secondary memory to a random access memory (RAM) of the application device, thereby setting the first application in an inactive state within the RAM. A central processing unit (CPU) of the application device does not actively process the first application while the first application is in the inactive state. Activating the first application can comprise the CPU actively processing the first application, thereby setting the first application in an active state. A central processing unit (CPU) of the application device does not actively process the second application while the second application is in the inactive state. The second application can be related to the first application based on a list of associations stored in a system file. The list of associations can be determined by technical relativity, user history relativity or a combination thereof.

In yet another aspect of the present invention, a method optimizes system resources within an application device. The method includes powering on an application device, selecting a first application by a user, launching the first application such that the first application is loaded from a secondary memory to a random access memory (RAM), thereby setting the first application in an inactive state within the RAM; activating the first application, selecting a second application by the user, de-activating the first application, thereby setting the first application in the inactive state, launching the second application such that the second application is loaded from a secondary memory to a random access memory (RAM), thereby setting the second application in an inactive state within the RAM, and activating the second application. A central processing unit (CPU) of the application device does not actively process the first application while the first application is in the inactive state. Activating the first application can comprise the CPU actively processing the first application, thereby setting the first application in an active state. A central processing unit (CPU) of the application device does not actively process the second application while the second application is in the inactive state. Activating the second application can comprise the CPU actively processing the second application, thereby setting the second application in an active state. The second application can be related to the first application based on a list of associations stored in a system file. The list of associations can be determined by technical relativity, user history relativity or a combination thereof.

In still yet another aspect of the present invention, a device includes a processor, a system memory coupled to the processor, and a secondary memory coupled to the processor and to the system memory, wherein the secondary memory includes a plurality of applications such that in operation a first application is loaded from the secondary memory to the system memory and set to an active state, a second application related to the first application is selected by the processor, loaded from the secondary memory to the system memory, and set to an inactive state, and when a user selects the second application, the first application is de-activated to the inactive state while the second application remains in the inactive state, and the second application is then set to an active state. The device can further comprise a user interface to receive command instructions and application selections from the user. The processor actively processes the first application while the first application is set to the active state and the processor actively processes the second application while the second application is set to the active state. The processor does not actively process the first application while the first application is set to the inactive state and the processor does not actively process the second application while the second application is set to the inactive state. The secondary memory can include a system file comprising a list of associations, wherein the list of associations associates an application to one or more other applications within the plurality of applications. The processor can utilize the list of associations to select the second application related to the first application. The list of associations can be determined by technical relativity, user history, or a combination thereof.

DETAILED DESCRIPTION OF THE EMBODIMENTS

Embodiments of the present invention include a device that maximizes system resources in a system resource limited environment. The device includes a system file which stores system-level attributes, also known as a list of associations, for each of a plurality of applications stored on the device. The applications are preferably stored within a secondary memory of the device, and once launched each application is loaded into RAM. The system-level attributes define related applications such that each application is associated to one or more of the other plurality of applications. When launching an application, the device also initiates the launch of one or more related applications in the background to quicken the application switching process. The list of associations is preferably determined via technical relativity or user history relativity.

In operation, a device is powered on. Preferably, no applications are launched when the device is powered on. A user selects a first application. The device launches the first application, thereby loading the first application from the secondary memory to RAM. The first application is set to an active state which means that a processor of the device is actively processing the first application. When the first application is set to the active state, an associated second application is determined from the system file. The associated second application is launched, thereby loading the second application into RAM, anticipating that the user will need to utilize that application. The second application is set to an inactive state which means that the processor is not actively processing the second application. When the second application is selected while the first application is still in the active state, the first application is first set to an inactive state, and then the second application is set to an active state. Once the second application is set to the active state, a third application associated with the second application is "pre-launched", thereby loading the third application into RAM and setting the third application to an inactive state. In this manner, whenever an application is determined to be associated with a currently active state application, and that associated application has yet to be loaded from secondary memory to RAM, the associated application is pre-launched, anticipating that the user will need to utilize that application and thereby accelerating the launching of the related application when it is selected by the user.

Figure 1:
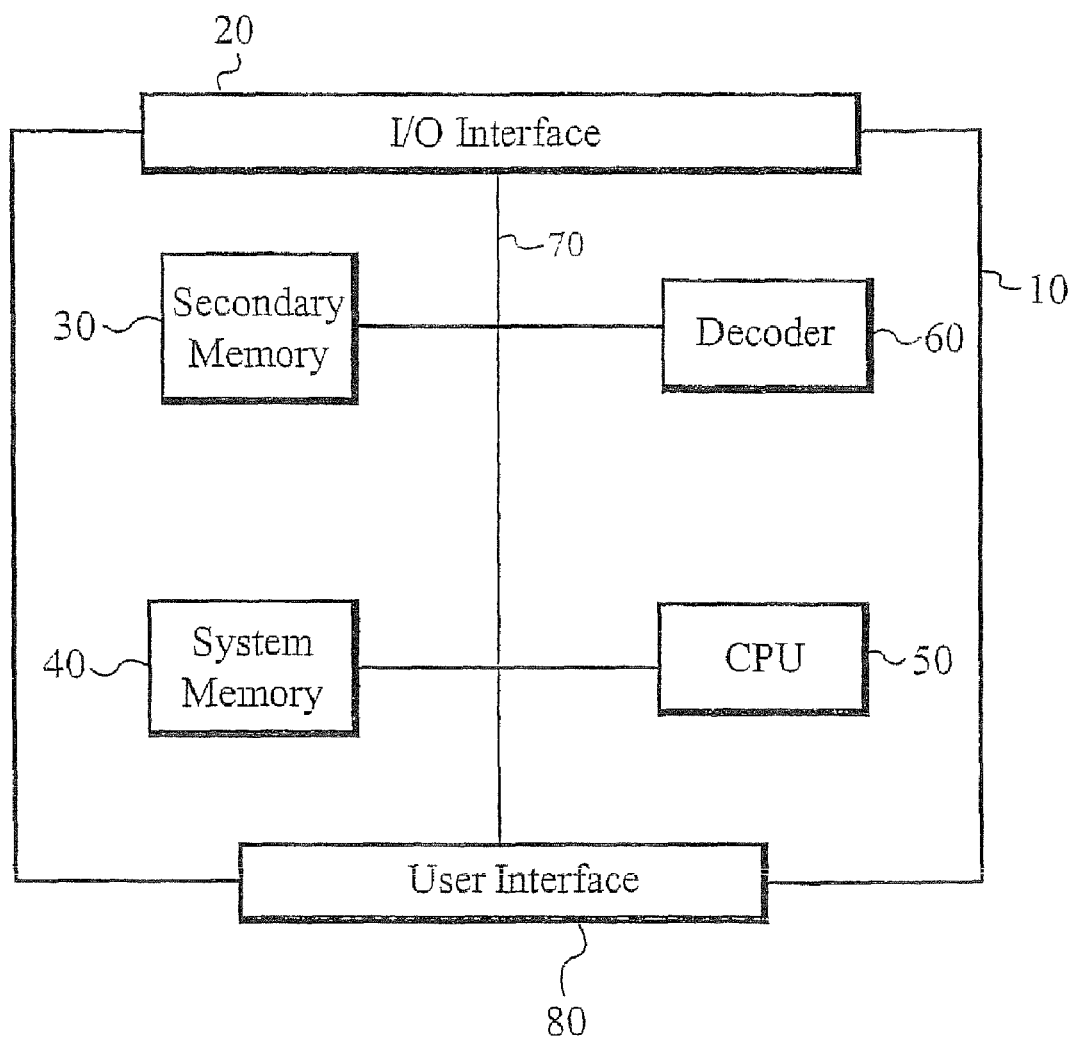
FIG. 1 illustrates an exemplary set-top box.

FIG. 1 illustrates an exemplary set-top box according to the present invention. The set-top box preferably controls the transmission of multimedia from a local storage device, such as a personal computer (PC), to a television or from a remote content provider, such as a cable television provider, to the television. The set-top box 10 includes an input/output (I/O) interface 20, a secondary memory 30, a system memory 40, a central processing unit (CPU) 50, a user interface 80, and a decoder 60 all coupled via a bi-directional bus 70. The I/O interface 20 preferably couples the set-top box 10 to a content source (not shown) for receiving multimedia and to the television (not shown) or other display device for displaying the multimedia received from the content source. The I/O interface 20 can also be coupled to a conventional network, such as the Internet, to receive periodic software upgrades including new versions of operating software and new or upgraded applications. The I/O interface 20 also sends and receives control signals to and from the user interface 80 and the television. The user interface 80 preferably comprises a keypad and display, as is well known in the art. Alternatively, the user interface 80 comprises any conventional user interface.

The secondary memory 30 stores the software used to enable operation of the set-top box 10 along with a plurality of applications. Exemplary applications include, but are not limited to a menu of available content such as an on-screen television guide, and display parameter settings such as color, tint, and brightness. Preferably, the secondary memory 30 is flash memory. Alternatively, any conventional type of memory can be used. Preferably, the system memory 40 includes random access memory (RAM). The system memory 40 can also include additional buffers, registers, and cache according to specific design implementations. Multimedia received by the set-top box 10 is preferably encrypted to prevent unauthorized access and use, and the decoder 60 decrypts the multimedia according to access authorization provided by the CPU 50.

Figure 2:
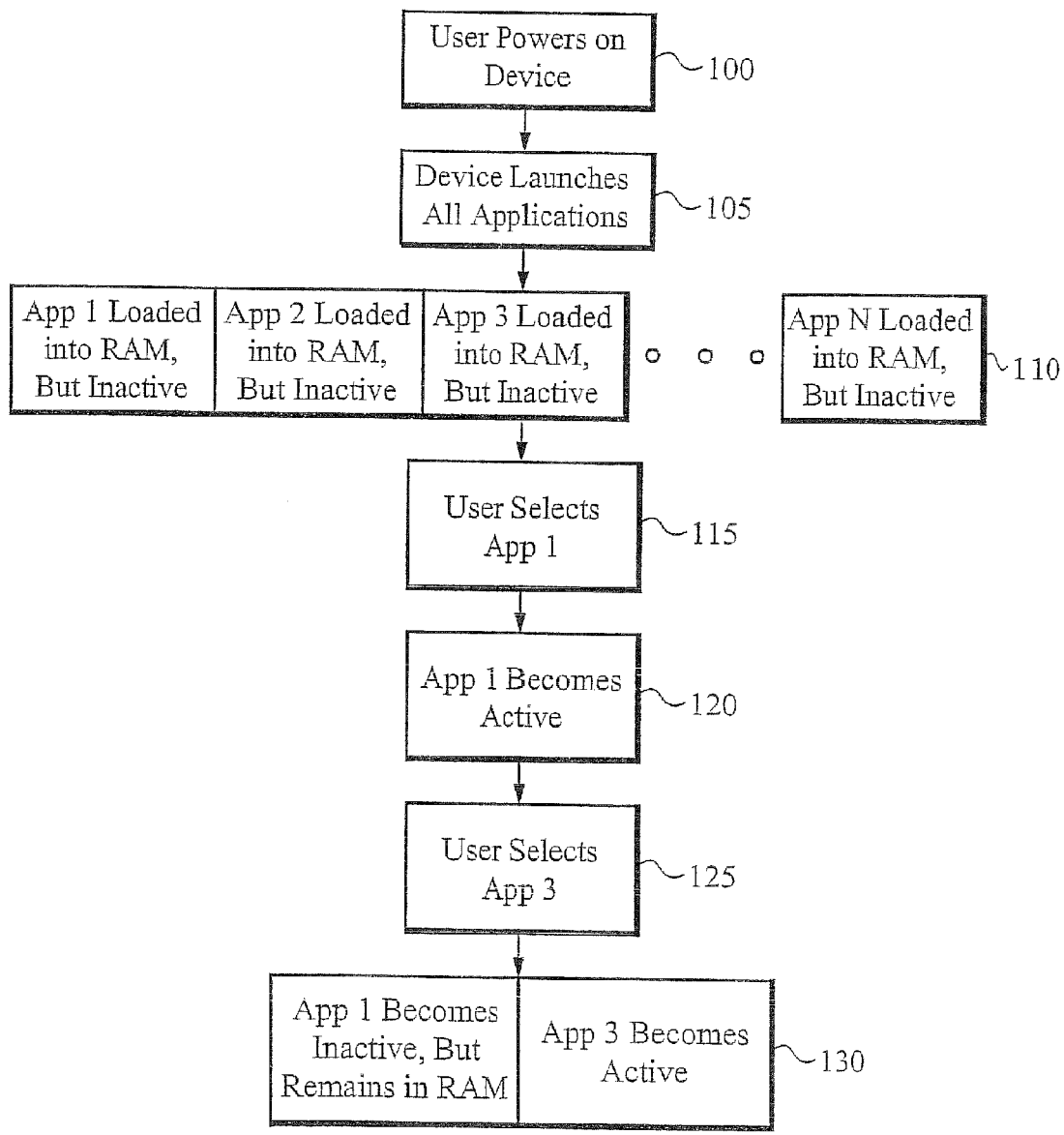
FIG. 2 illustrates a first process of the present invention in which utilization of system resources is optimized.

FIG. 2 illustrates a first process of the present invention in which utilization of system resources is optimized. At the step 100, a user powers on a device. At the step 105, the device launches all applications. Preferably, launching an application refers to copying the application from a secondary memory, such as flash memory, to a system memory, such as RAM. The applications are preferably launched in a predetermined order. Alternatively, if sufficient system resources are available, more than one or all applications can be loaded simultaneously. At the step 110, all applications, for example applications 1 to N, loaded into RAM at the step 105 are set to an inactive state. As described above, an application in the inactive state is not actively being processed by the processor. At the step 115, the user selects application 1. In response to this user selection, at the step 120, application 1 is set to an active state. An application in the active state is actively being processed by the device processor. At the step 125, the user selects another application, in this case application 3. In response to this user selection, at the step 130, application 1 is set to the inactive state and remains in RAM, while application 3 is concurrently set to an active state. An application in the inactive state is not actively being processed by the device processor. Preferably, when the state of an application changes from active to inactive, the processor is essentially disengaged from the application, and all related interim storage mediums such as buffers, registers, and cache associated with the active processing of the application are cleared. A process similar to the steps 115 through 130 is repeated for each new application selection made by the user.

Figure 3:
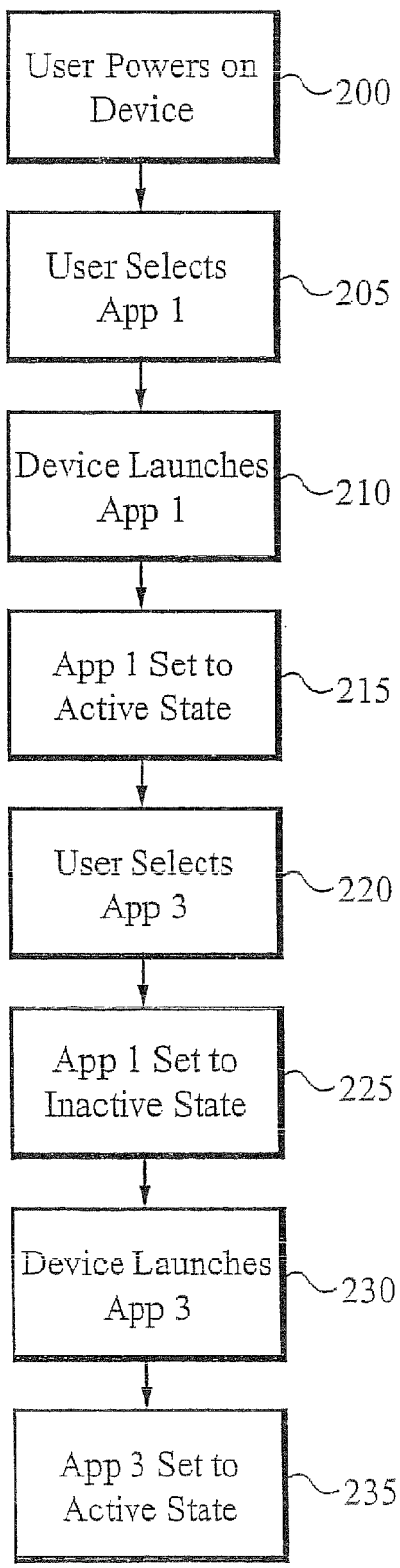
FIG. 3 illustrates a process in which there is no optimization of system resources.

FIG. 3 illustrates a process in which there is no optimization of system resources. At the step 200 a user powers on a device. At the step 205, the user selects application 1. In response to this user selection, at the step 210, the device launches application 1, thereby loading application 1 into RAM. At the step 215, application 1 is set to an active state. At the step 220, the user selects another application, in this case application 3. In response to this user selection, at the step 225 the device sets application 1 to an inactive state. Once application 1 is set to the inactive state, then at the step 230 the device launches application 3, thereby loading application 3 into RAM. At this point, both application 1 and application 3 are stored into RAM and set to the inactive state. At the step 235, application 3 is set to an active state. A process similar to the steps 220 through 235 is repeated for each new application selection made by the user.

Figure 4:
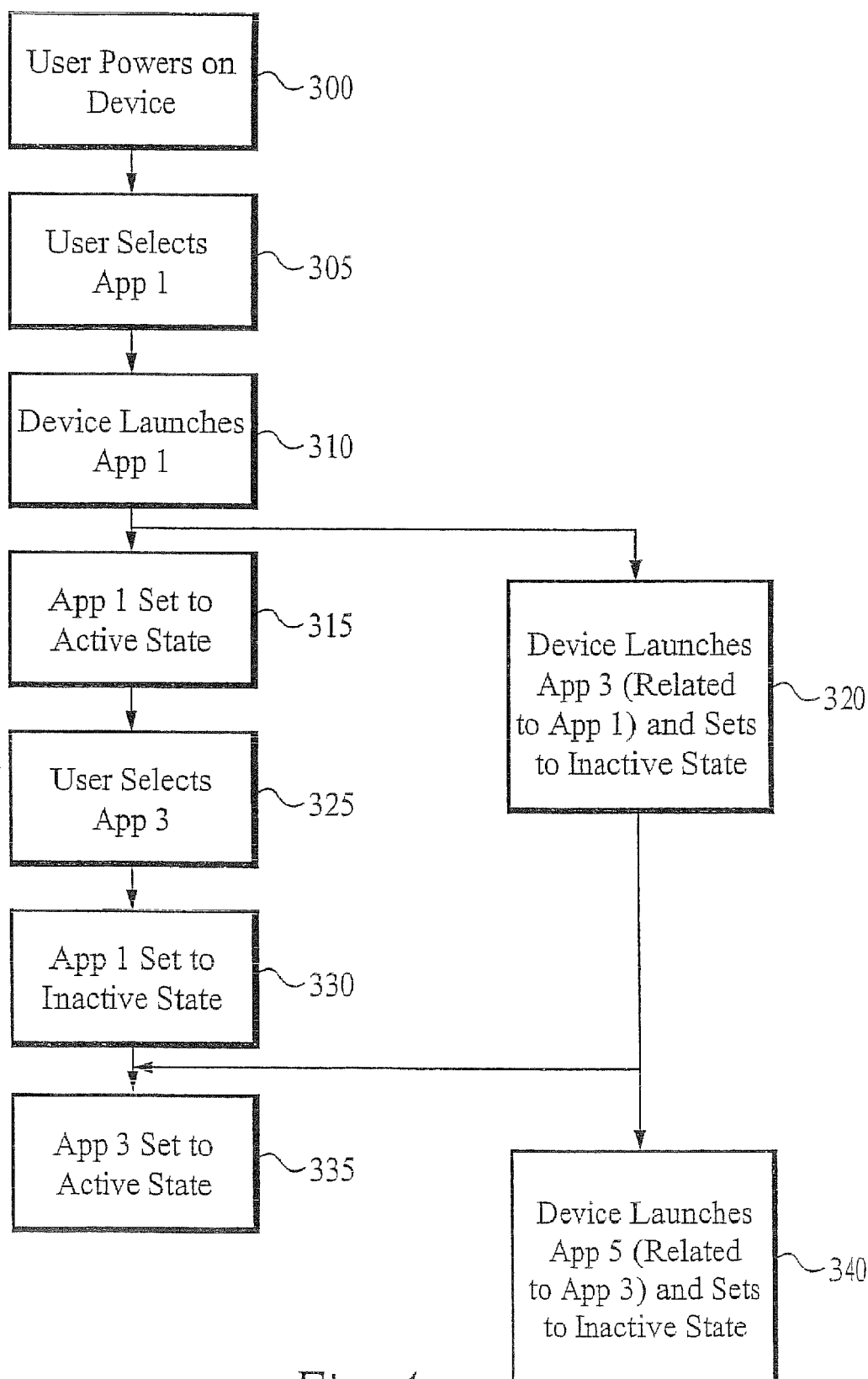
FIG. 4 illustrates a third and preferred process of the present invention in which utilization of system resources is optimized.

FIG. 4 illustrates a third and preferred process of the present invention in which utilization of system resources is optimized. At the step 300, a user powers on a device. At the step 305, the user selects application 1. In response to this user selection, at the step 310 the device launches application 1, thereby loading application 1 into RAM. At the step 315, application 1 is set to an active state. Subsequent to application 1 being loaded into RAM and set to the active state, at the step 320 the device launches an application, in this case application 3, which is related to application 1. Application 3 is loaded into RAM and set to an inactive state. At this point, application 1 is stored in RAM and set to the active state, and application 3 is stored in RAM and set to the inactive state. At the step 325, the user selects another application, in this case application 3. In response to this user selection, at the step 330 the device sets application 1 to the inactive state such that both application 1 and application 3 are stored in RAM and set to the inactive state. At the step 335, the selected application 3 is set to an active state. This transition to an active state for application 3, is very fast in the preferred embodiment of the present invention, because the application 3 has been pre-launched in anticipation of the user selection. Subsequent to application 3 being set to the active state, at the step 340 the device launches application 5, which is related to application 3. Application 5 is stored in RAM and set to an inactive state. A process similar to the steps 325 through 340 is repeated for each new application selection made by the user.

Preferably, each application launched and loaded into RAM remains in RAM, whether or not the application is in the active or the inactive state, until the device is powered off. For example, after the step 340 is performed, applications 1, 3, and 5 are each stored in RAM with applications 1 and 5 set to the inactive state and application 3 set to the active state. Alternatively, as each application is changed from the active state to the inactive state, it is closed. For example, in this alternative embodiment, before the step 340 is performed, an additional step of closing application 1 is performed. Then, after step 340 is performed, two applications are stored in RAM, application 3 set to the active state and application 5 set to the inactive state. In this manner, only related applications are ever stored in RAM at any given time in this alternative embodiment. The stored applications in RAM are the currently active application and the one or more applications related to the currently active application. In a further alternative embodiment, a maximum number of applications stored in RAM can be set so that once that maximum number is reached, and as a new related application is to be launched and loaded into RAM, one or more of the applications which are currently stored in RAM and set to the inactive state can be closed based on a prioritization scheme.

The device includes a system file in which relationships between applications are stored. Preferably, each relationship associates a particular application to one or more other particular applications. For example, if an application such as a browser is launched and set to an active state, a related application can be a JPEG viewer. In the preferred embodiment, the JPEG viewer is launched as the related application to the browser application and set to an inactive state, which essentially places the JPEG viewer in the background while the browser application remains in the foreground. Alternatively, each particular application can be related to multiple applications. Depending on system resources, each of the multiple related applications can be launched, loaded into RAM and set to an inactive state, or the multiple related applications can be prioritized based on the context of the current active application. The one, or more than one, related application with the highest priority is then launched, loaded into RAM and set to the inactive state. Alternatively, when the context of the active application changes, the related application(s) loaded in RAM and set to the inactive state can be closed and cleared from RAM, and another related application can be launched, loaded into RAM and set to an inactive state. For example, if the browser application is the active application, and the JPEG viewer is the related application loaded in RAM and set to the inactive state, and the user moves a cursor from a link corresponding to a JPEG file type, which is what caused the JPEG viewer to initially be loaded into RAM and set to the inactive state, to a link corresponding to a different file type such as an MPEG file type, then the JPEG viewer is closed and cleared from RAM and a media player application which supports the MPEG file type is launched, loaded into RAM and set to an inactive state.

In operation, a device is powered on. Preferably, no applications are launched during power on. A user selects a first application. The device launches the first application, thereby loading the first application from a secondary memory, preferably flash memory, to a system memory, preferably RAM. The first application is set to an active state which means that a processor of the device is actively processing the first application. Preferably, a system file stores a list of associations which relates the first application to a second application, the second application to a third application, and so on. Preferably, each application is associated to one other application. Alternatively, each application is associated with one or more other applications. When the first application is set to the active state, an associated second application is determined from the system file. The associated second application is launched, thereby loading the second application into RAM. The second application is set to an inactive state which means that the processor is not actively processing the second application. In an alternative embodiment in which more than one application is related to the first application set to the active state, the more than one related applications are all launched, thereby loading the more than one related applications into RAM, and setting them to the inactive state. In a further alternative embodiment in which more than one application is related to the first application set to the active state, the more than one related applications are ranked according to a prioritization scheme, and the related application ranked the highest is launched, thereby loading the highest ranked related application into RAM, and setting it to the inactive state. Preferably, only one application is set to the active state at any given moment. By "pre-launching" the second application, the device quickens the application switching process. In this manner, when the second application is selected for use, the second application does not require the system resources necessary to copy the second application from secondary memory to RAM. By pre-launching the second application, when the second application is selected while the first application is still in the active state, the first application is first set to an inactive state, and then the second application is set to an active state. Once the second application is set to the active state, a third application associated with the second application is pre-launched, thereby loading the third application into RAM and setting the third application to an inactive state. In this manner, whenever an application is determined to be associated with a currently active state application, and that associated application has yet to be loaded from secondary memory to RAM, the associated application is pre-launched. Pre-launching maximizes system resources by eliminating the need to launch an application from secondary memory while also switching states from an inactive application to an active application. This also quickens the switching process from one active application to another active application in a limited resource environment.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with set-top boxes, the present invention can also be implemented on any other appropriate system resource limited device.

What is claimed is:

1. A method to optimize system resources within an application device, the method comprising:
    setting a first application in an active state by actively processing the first application with a processing unit of the application device;
    selecting a second application related to the first application based on the relation of the second application to the first application, wherein selecting the second application is performed by the application device;
    launching the second application, thereby setting the second application in an inactive state while the first application remains in the active state;
    selecting the second application for use;
    de-activating the first application upon selecting the second application for use, thereby setting the first application in the inactive state; and
    activating the second application, thereby setting the second application in an active state.

2. The method of claim 1 wherein setting the first application further comprises loading the first application from a secondary memory to a random access memory (RAM) of the application device prior to actively processing the first application.

3. The method of claim 1 wherein launching the second application comprises loading the second application from a secondary memory to a random access memory (RAM), thereby setting the second application in an inactive state within the RAM.

4. The method of claim 3 wherein the processing unit does not actively process the first application while the first application is in the inactive state.

5. The method of claim 4 wherein activating the second application comprises the processing unit actively processing the second application, thereby setting the second application in the active state.

6. The method of claim 3 wherein the processing unit does not actively process the second application while the second application is in the inactive state.

7. The method of claim 1 further comprising:
    selecting a third application related to the second application, wherein selecting the third application is performed by the application device; and
    launching the third application, thereby setting the third application in an inactive state while the second application remains in the active state.

8. The method of claim 7 further comprising:
selecting the third application for use;
de-activating the second application, thereby setting the second application in the inactive state; and
activating the third application, thereby setting the third application in an active state.

9. A method to optimize system resources within an application device, the method comprising:
launching a first application such that the first application is loaded from a secondary memory, wherein the secondary memory is located on the application device, to a random access memory (RAM), thereby setting the first application in an inactive state within the RAM;
setting the first application in an active state;
selecting a second application related to the first application based on the relation of the second application to the first application, wherein selecting the second application is performed by the application device;
launching the second application, thereby setting the second application in an inactive state while the first application remains in the active state;
selecting the second application for use;
de-activating the first application, thereby setting the first application in the inactive state; and
activating the second application, thereby setting the second application in an active state.

10. The method of claim 9 wherein setting the first application in the active state comprises actively processing the first application with a central processing unit (CPU) of the application device.

11. The method of claim 10 wherein setting the first application further comprises loading the first application from a secondary memory to a random access memory (RAM) of the application device prior to actively processing the first application.

12. The method of claim 10 wherein launching the second application comprises loading the second application from a secondary memory to a random access memory (RAM), thereby setting the second application in an inactive state within the RAM.

13. The method of claim 12 wherein the CPU does not actively process the first application while the first application is in the inactive state.

14. The method of claim 13 wherein activating the second application comprises the CPU actively processing the second application, thereby setting the second application in the active state.

15. The method of claim 12 wherein the CPU does not actively process the second application while the second application is in the inactive state.

16. The method of claim 9 further comprising:
selecting a third application related to the second application, wherein selecting the third application is performed by the application device; and
launching the third application, thereby setting the third application in an inactive state while the second application remains in the active state.

17. The method of claim 16 further comprising:
selecting the third application for use;
de-activating the second application, thereby setting the second application in the inactive state; and
activating the third application, thereby setting the third application in an active state.

* * * * *